(12) United States Patent
Dziuda et al.

(10) Patent No.: US 12,729,702 B2
(45) Date of Patent: Sep. 8, 2026

(54) AUTOMOTIVE FLANGED INTERFACE ATTACHMENT

(71) Applicant: GM GLOBAL TECHNOLOGY OPERATIONS LLC, Detroit, MI (US)

(72) Inventors: Brandon Dziuda, Detroit, MI (US); Brendan Wayne Cooper, Farmington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 275 days.

(21) Appl. No.: 18/677,253

(22) Filed: May 29, 2024

(65) Prior Publication Data

US 2025/0369467 A1 Dec. 4, 2025

(51) Int. Cl.
*F16B 5/06* (2006.01)
*B60R 19/18* (2006.01)

(52) U.S. Cl.
CPC .... *F16B 5/0635* (2013.01); *B60R 2019/1886* (2013.01)

(58) Field of Classification Search
CPC ....................... F16B 5/0635; B60R 2019/1886
See application file for complete search history.

(56) References Cited

U.S. PATENT DOCUMENTS 6,715,764 B2 4/2004 Delavalle et al.
7,086,679 B2 * 8/2006 Andre ................. B62D 25/163 296/29
2004/0007831 A1 1/2004 Selby
2005/0241918 A1 * 11/2005 Alldredge ............. B65G 17/02 198/728
2013/0239391 A1 9/2013 Percy et al.

FOREIGN PATENT DOCUMENTS

DE 112012007230 T5 1/2016
WO WO-2007068634 A1 * 6/2007 ......... A47L 15/4246
WO WO-2014122844 A1 * 8/2014 ............ F16B 5/0664

OTHER PUBLICATIONS

German Office Action for German Application No. 102024121350.7; dated Apr. 4, 2025; 5 pages.

* cited by examiner

*Primary Examiner* — Robert E Fuller

(74) *Attorney, Agent, or Firm* — CANTOR COLBURN LLP

(57) ABSTRACT

An assembly of a first component and a second component of a vehicle includes a first component having a first flange and a plurality of first flange openings in the first flange, and a second component having a second flange and a plurality of second flange teeth, the plurality of second flange teeth extending through the plurality of first flange openings. A flange lock is installed over the first flange and the second flange to retain the first flange to the second flange. The flange lock includes a first lock arm and a second lock arm. The first lock arm engages the plurality of second flange teeth.

20 Claims, 10 Drawing Sheets

AUTOMOTIVE FLANGED INTERFACE ATTACHMENT

INTRODUCTION

The subject disclosure relates to vehicles, and more particularly to the attachment of components with turned flanges on vehicles.

There are multiple locations across a vehicle exterior where fascia or trim components interface using turned flanges that are parallel to each other and fastened together using primarily bolts, brackets, or clips. Generally, these attachment strategies require application of fasteners perpendicular to the flanges to provide clamp load and alignment between the two components. While these are effective methods, they limit vehicle exterior surface geometry and can be difficult to design allowing for the necessary space required by fastener installation tools due to surrounding vehicle components.

SUMMARY

In one exemplary embodiment, an assembly of a first component and a second component of a vehicle includes a first component having a first flange and a plurality of first flange openings in the first flange, and a second component having a second flange and a plurality of second flange teeth, the plurality of second flange teeth extending through the plurality of first flange openings. A flange lock is installed over the first flange and the second flange to retain the first flange to the second flange. The flange lock includes a first lock arm and a second lock arm. The first lock arm engages the plurality of second flange teeth.

In addition to one or more of the features described herein, the flange lock includes a lock spine, with the first lock arm and the second lock arm extending from the lock spine.

In addition to one or more of the features described herein, the flange lock has a substantially C-shaped cross-section.

In addition to one or more of the features described herein, the plurality of second flange teeth extend from a first side of the second flange and a rib extends from a second side of the second flange opposite the first side. The second lock arm engages the rib.

In addition to one or more of the features described herein, the second lock arm includes a second arm rib protruding therefrom configured to bias the second lock arm into engagement with the rib.

In addition to one or more of the features described herein, the first lock arm includes a first arm rib protruding therefrom configured to bias the first lock arm into engagement with the plurality of second flange teeth.

In addition to one or more of the features described herein, the flange lock includes a plurality of first portions formed from a first material having a first stiffness and a plurality of second portions formed from a second material having a second stiffness different from the first stiffness.

In addition to one or more of the features described herein, a handle extends from an end of the flange lock.

In addition to one or more of the features described herein, a plurality of second flange openings are defined in the second flange, and one or more second leg locks are located in the second lock arm and are configured to engage the plurality of second flange openings.

In another exemplary embodiment, a vehicle includes a body panel of the vehicle including a panel flange. The panel flange includes a plurality of panel flange openings. A bumper cover assembly is installed to the body panel, the bumper cover assembly includes a bumper cover flange. The bumper cover flange includes a plurality of cover flange teeth. The plurality of cover flange teeth extend through the plurality of panel flange openings, and a flange lock is installed over the panel flange and the bumper cover flange to retain the panel flange to the bumper cover flange.

The flange lock includes a first lock arm and a second lock arm, the first lock arm engaging the plurality of cover flange teeth.

In addition to one or more of the features described herein, the flange lock includes a lock spine, with the first lock arm and the second lock arm extending from the lock spine.

In addition to one or more of the features described herein, the flange lock has a substantially C-shaped cross-section.

In addition to one or more of the features described herein, the plurality of cover flange teeth extend from a first side of the bumper cover flange and a rib extends from a second side of the bumper cover flange opposite the first side. The second lock arm engages the rib.

In addition to one or more of the features described herein, the second lock arm includes a second arm rib protruding therefrom configured to bias the second lock arm into engagement with the rib.

In addition to one or more of the features described herein, the first lock arm includes a first arm rib protruding therefrom configured to bias the first lock arm into engagement with the plurality of cover flange teeth.

In addition to one or more of the features described herein, the flange lock includes a plurality of first portions formed from a first material having a first stiffness and a plurality of second portions formed from a second material having a second stiffness different from the first stiffness.

In addition to one or more of the features described herein, a handle extends from an end of the flange lock.

In addition to one or more of the features described herein, a plurality of cover flange openings are defined in the cover flange, and one or more second leg locks are positioned in the second lock arm and are configured to engage the plurality of cover flange openings.

In addition to one or more of the features described herein, the bumper cover assembly includes a bumper cover, and a cover bracket secured to the bumper cover. The bumper cover flange is defined in the cover bracket.

In yet another exemplary embodiment, a method of installing a bumper cover assembly to a vehicle body includes providing a body panel of the vehicle. The body panel includes a panel flange and the panel flange includes a plurality of panel flange openings. A bumper cover assembly including a bumper cover flange is installed to the body panel. The bumper cover flange includes a plurality of cover flange teeth. The bumper cover assembly includes plurality of cover flange teeth extending through the plurality of panel flange openings. A flange lock is installed over the panel flange and the bumper cover flange to retain the panel flange to the bumper cover flange. The flange lock includes a first lock arm and a second lock arm, the first lock arm engaging the plurality of cover flange teeth.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
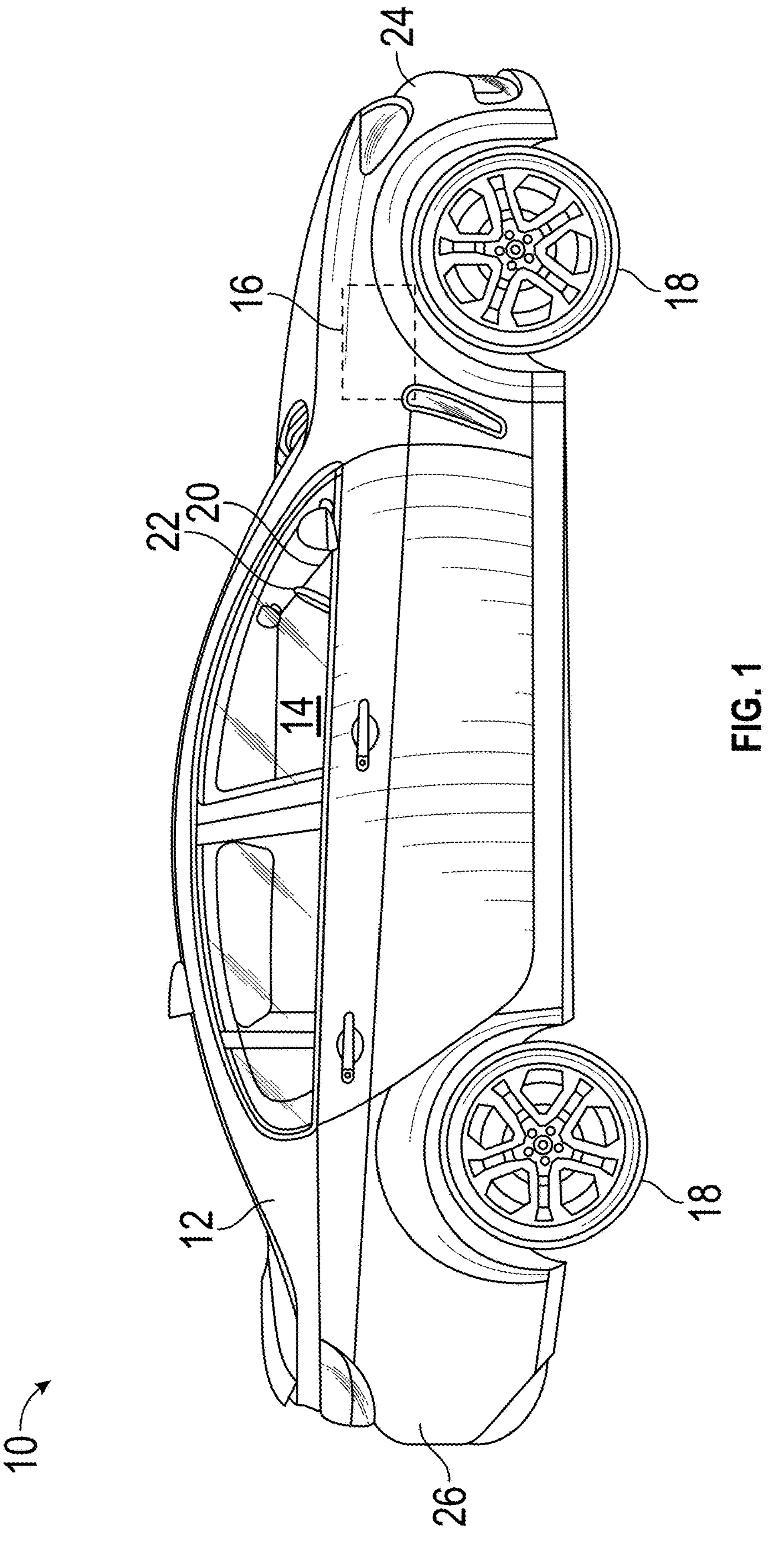
FIG. 1 is a perspective view of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, illustrated in FIG. 1 is an embodiment of a vehicle 10. The vehicle 10 includes a vehicle body 12 defining a passenger compartment 14. The vehicle 10 further includes a powertrain 16 providing energy for propulsion and electrical power for operation of the vehicle systems. A plurality of wheels 18 are operably connected to the powertrain 16, and at least two of the wheels 18 are steerable. An instrument panel 20 is located in the passenger compartment 14, and a steering assembly 22 extends from the instrument panel 20 into the passenger compartment 14.

The vehicle 10 includes one or more trim components assembled to the vehicle body 12, for example, a front bumper cover 24 and a rear bumper cover 26. While the following description is presented in the context of installation of the front bumper cover 24 to the vehicle body 12, one skilled in the art will readily appreciate that the present disclosure is further applicable to the installation of the rear bumper cover 26 or other components to the vehicle body 12, such as weather stripping, door trim assemblies or the like. Additionally, one skilled in the art will readily appreciate that embodiments of the present disclosure may be utilized in non-vehicle applications, such as furniture, plastic assemblies such as toys or the like.

Figure 2:
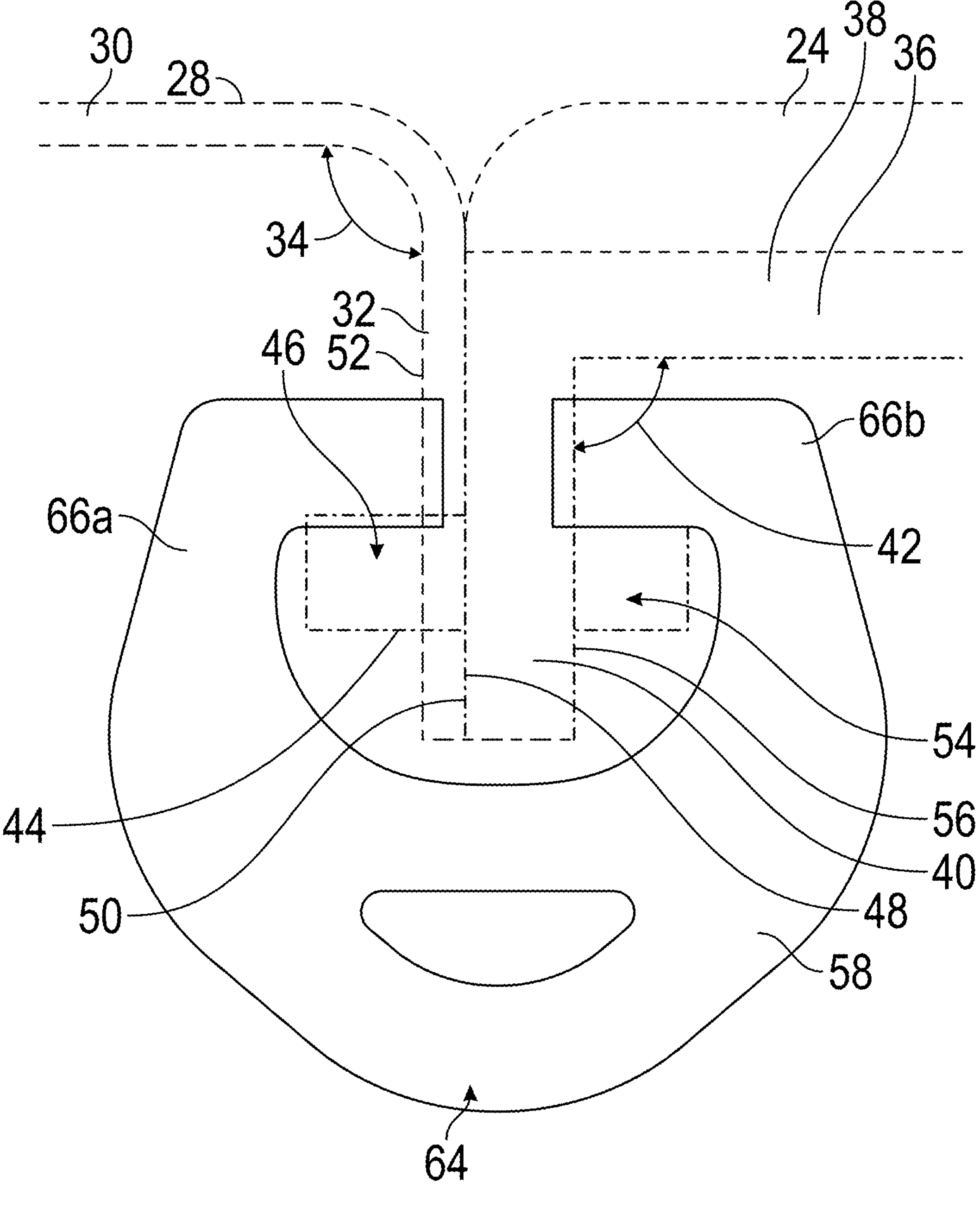
FIG. 2 is a cross-sectional view of an exemplary embodiment of a flange interface between two components.

FIG. 2 illustrates an exemplary embodiment of a flanged connection of a first component, for example, a body panel 28 of the vehicle body 12, to a second component, for example, the front bumper cover 24. In some embodiments, the body panel 28 is formed from a metal material such as steel or from a plastic or composite material. The front bumper cover 24 is formed from a plastic material or alternatively a metal or composite material.

The body panel 28 includes a panel body 30 with a panel flange 32 extending from the panel body 30 at a nonzero flange angle 34 which is, for example 90 degrees. The front bumper cover 24 includes a flange bracket 36 secured thereto by, for example, welding, adhesive, or the like. Alternatively, in other embodiments the features of the flange bracket 36 are unitary with the front bumper cover 24 by, for example, inmolding the features of the flange bracket 36 into the front bumper cover 24. The flange bracket 36 includes a bracket body 38 at which the flange bracket 36 is secured to the front bumper cover 24, and a bracket flange 40 extending from the bracket body 38 at a nonzero bracket angle 42, which is, in some embodiments 90 degrees. The flange angle 34 is complementary to the bracket angle 42 such that when the front bumper cover 24 is assembled to the body panel 18, the panel flange 32 abuts the bracket flange 40.

Figure 3:
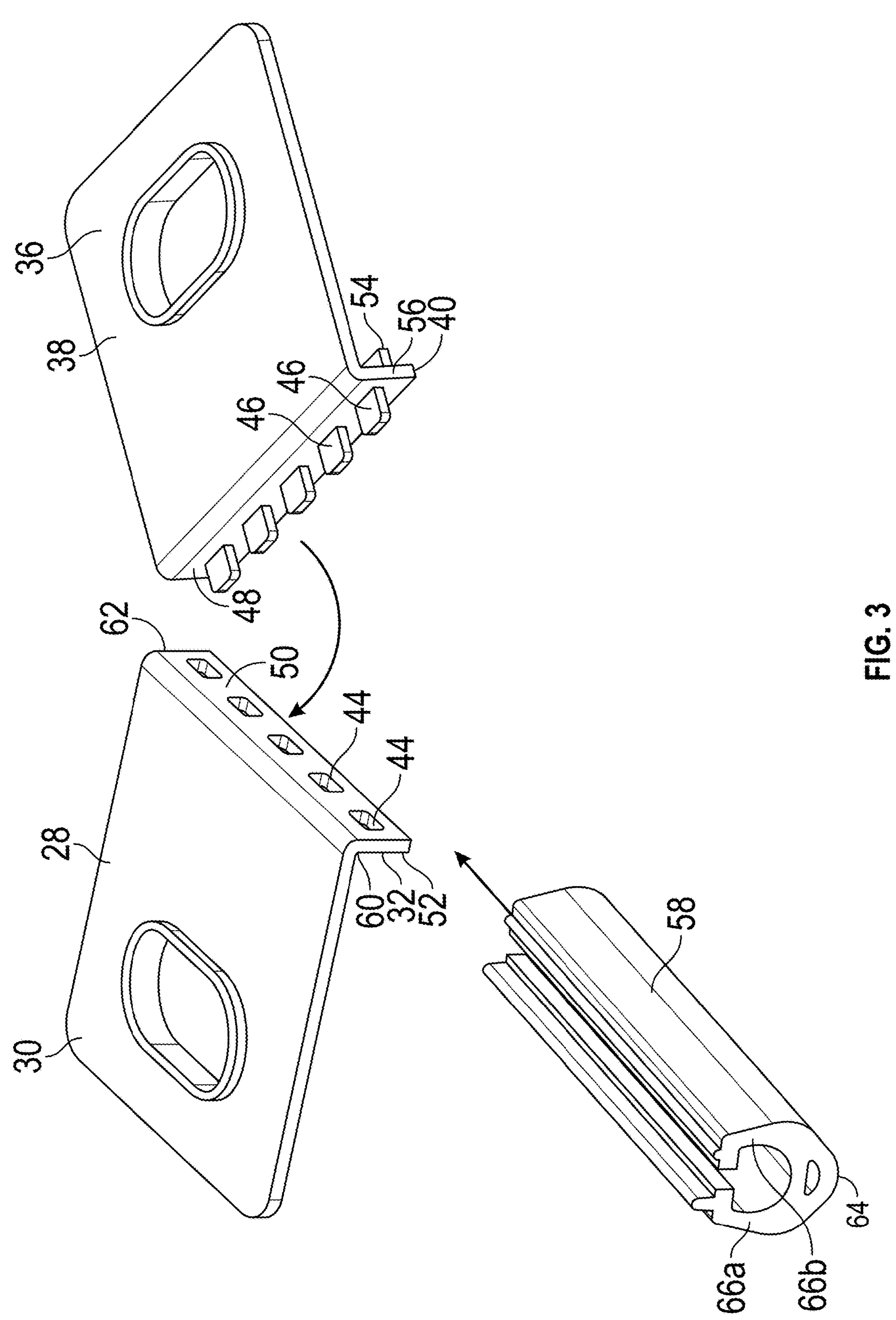
FIG. 3 is a disassembled view of an exemplary embodiment of a flange interface.

Referring now to FIG. 3, with continuing reference to FIG. 2, the panel flange 32 includes a plurality of panel flange openings 44 extending therethrough. A plurality of bracket flange teeth 46 extend from a first bracket side 48 of the bracket flange 40 toward the panel flange openings 44, such that each bracket flange tooth 46 extends into a corresponding panel flange opening 44 of the plurality of panel flange openings 44 at a first panel flange side 50 and out of the panel flange openings 44 at a second panel flange side 52 opposite the first panel flange side 50. While embodiments including multiple flange teeth 46 are illustrated in FIG. 3 and described herein, other embodiments may utilize a single flange tooth 46 installed into a single panel flange opening 44. The flange bracket 36 further includes a bracket rib 54 extending from a second bracket side 56 opposite the first bracket side 48. While in the described embodiment the openings 44 are in the body panel 18 and the teeth 46 are in the flange bracket 36, in other embodiments the configuration may be substantially reversed, with the openings 44 formed in the flange bracket 36 and the teeth 46 formed in the body panel 18.

To secure the panel flange 32 to the bracket flange 40, a C-shaped flange lock 58 is installed thereto, for example, by sliding the flange lock 58 from a first flange end 60 toward a second flange end 62. The flange lock 58 includes a lock spine 64 and two lock arms 66 extending in opposing directions from the lock spine 64 and curving toward the panel flange 32 and the flange bracket 36, such that when installed, a first lock arm 66*a* abuts and engages the bracket flange teeth 46 extending through the panel flange openings 44, and a second lock arm 66*b* abuts and engages the bracket rib 54. The flange lock 58 thereby secures the panel flange 32 to the bracket flange 40 and thus secure the body panel 18 to the front bumper cover 24.

Figure 4:
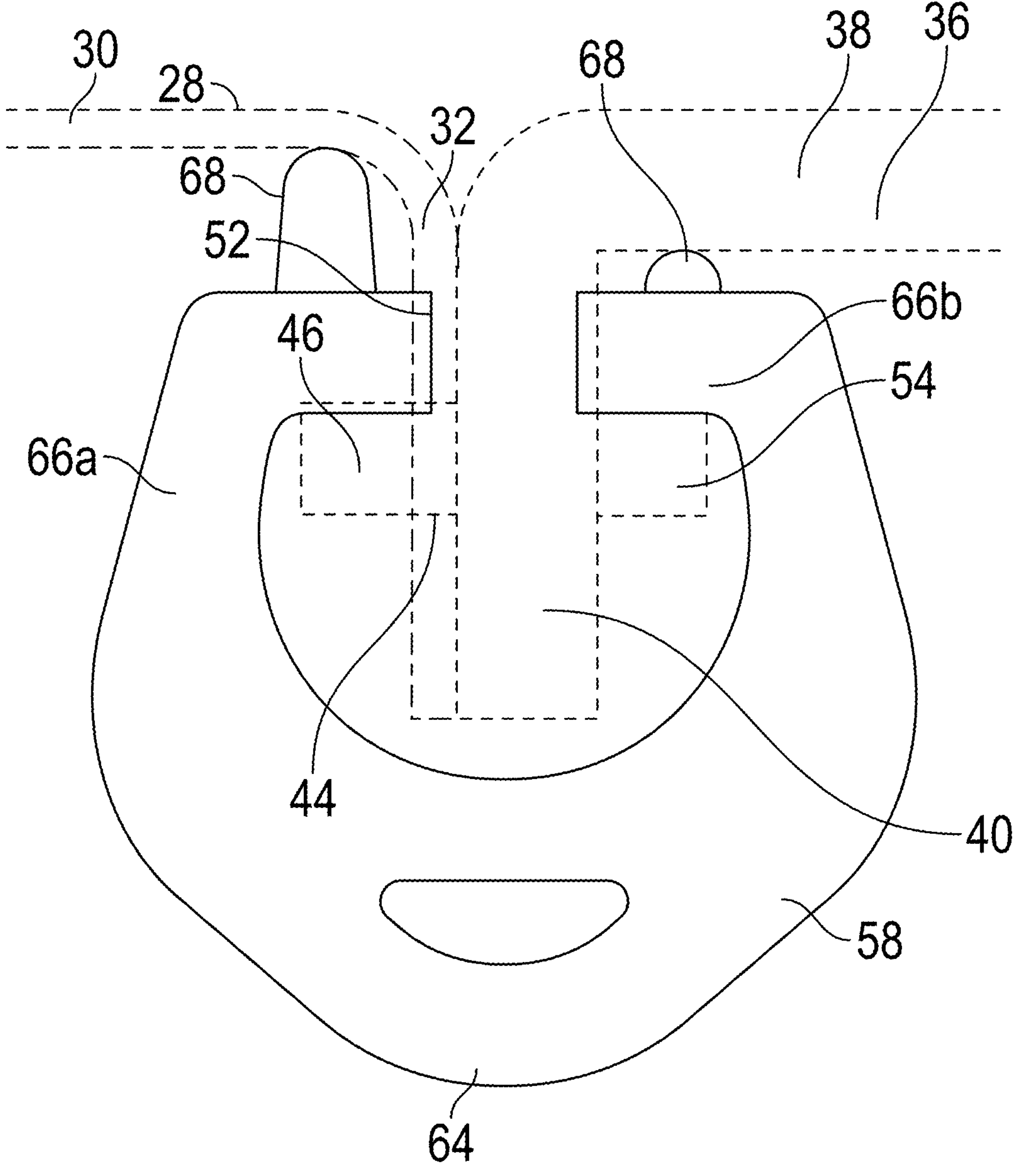
FIG. 4 is another cross-sectional view of an exemplary embodiment of a flange interface.

Referring now to FIG. 4, in some embodiments the lock arms 66*a* and 66*b* include arm ribs 68 that extend toward the panel body 30 and the bracket body 38, respectively. The arm ribs 68 contact the panel body 30 and bracket body 38 thereby urging the first lock arm 66*a* into engagement with the bracket flange teeth 46 and the second lock arm 66*b* into engagement with the bracket rib 54.

Figure 5:
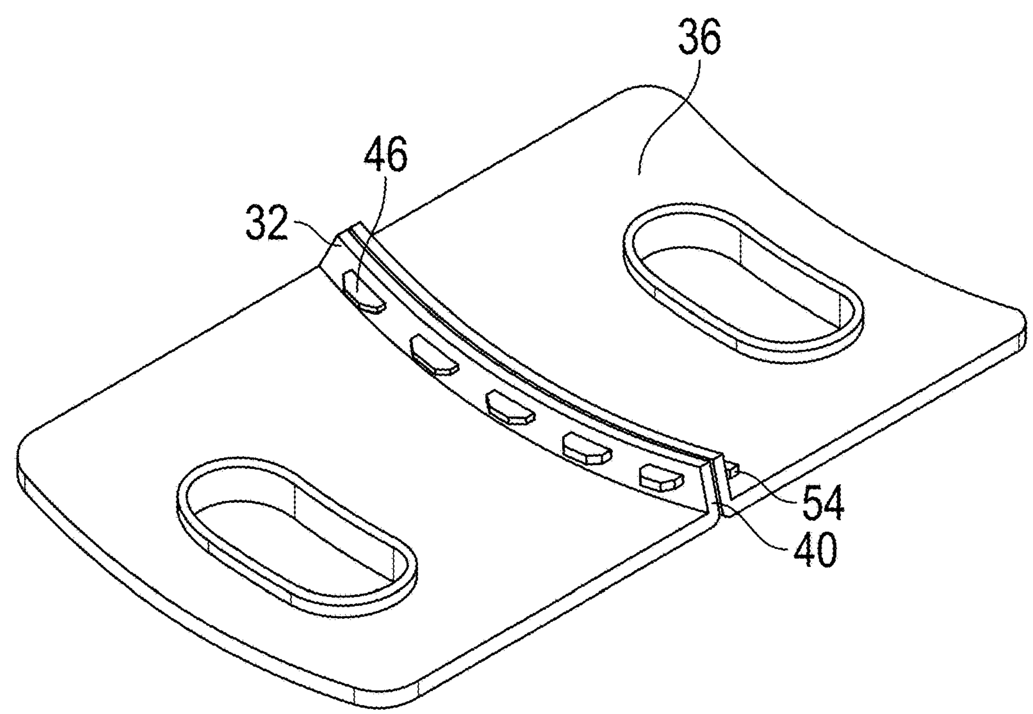
FIG. 5 is a perspective view of an exemplary embodiment of a flange interface.
Figure 6:
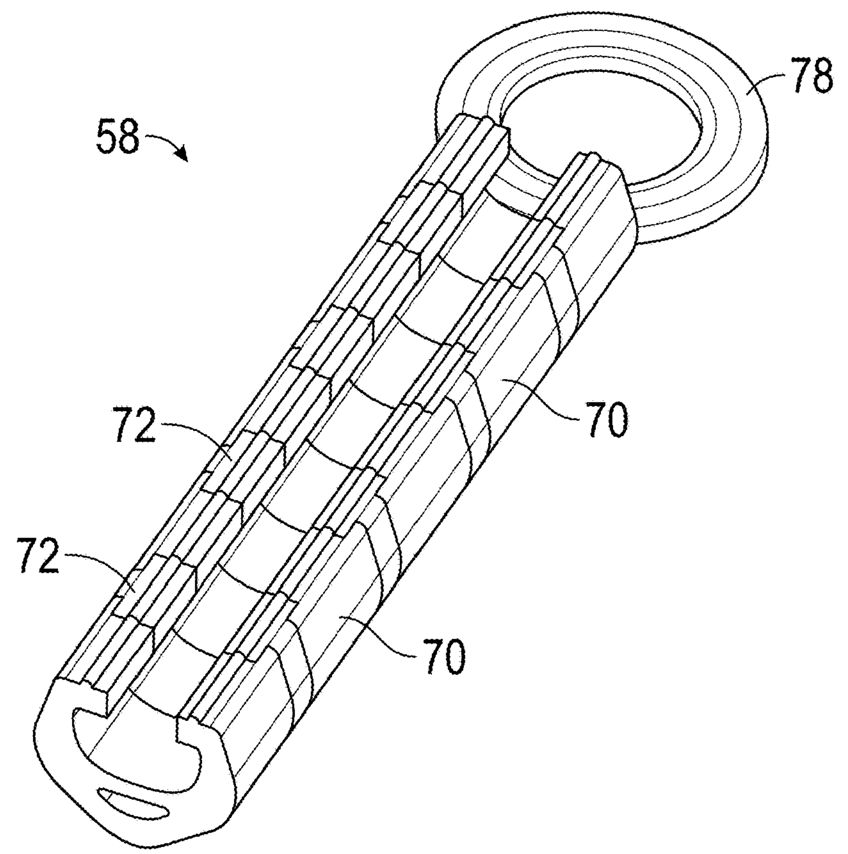
FIG. 6 is a perspective view of an exemplary embodiment of a flange lock.
Figure 7:
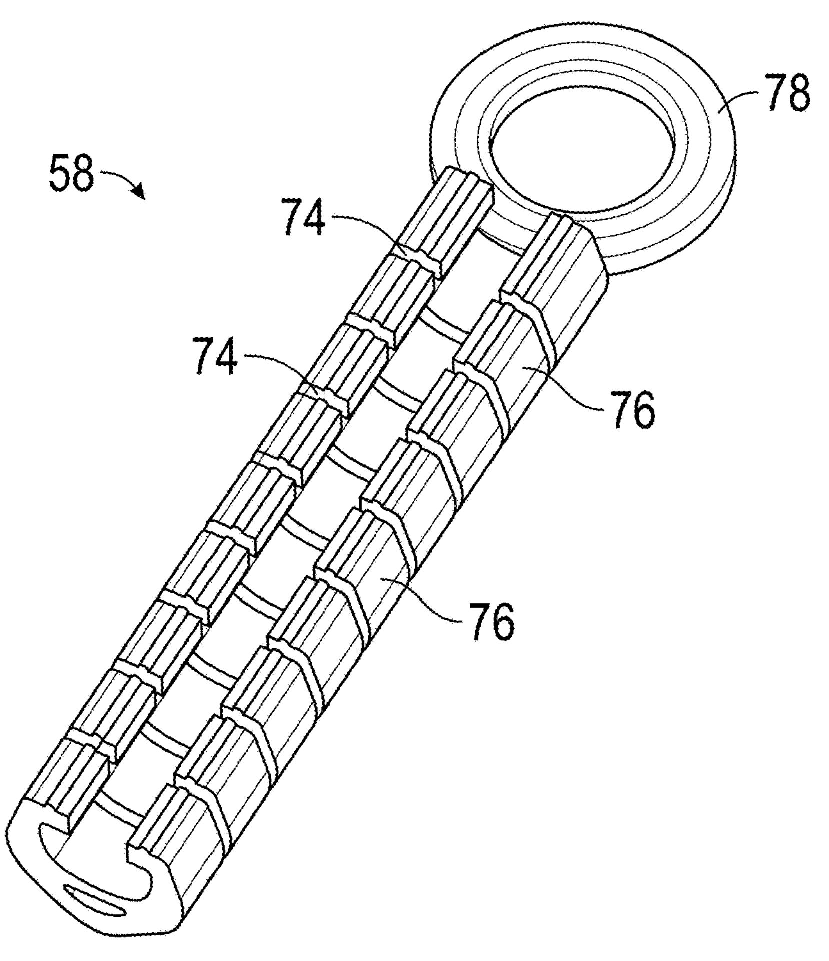
FIG. 7 is a perspective view of another exemplary embodiment of a flange lock.
Figure 8:
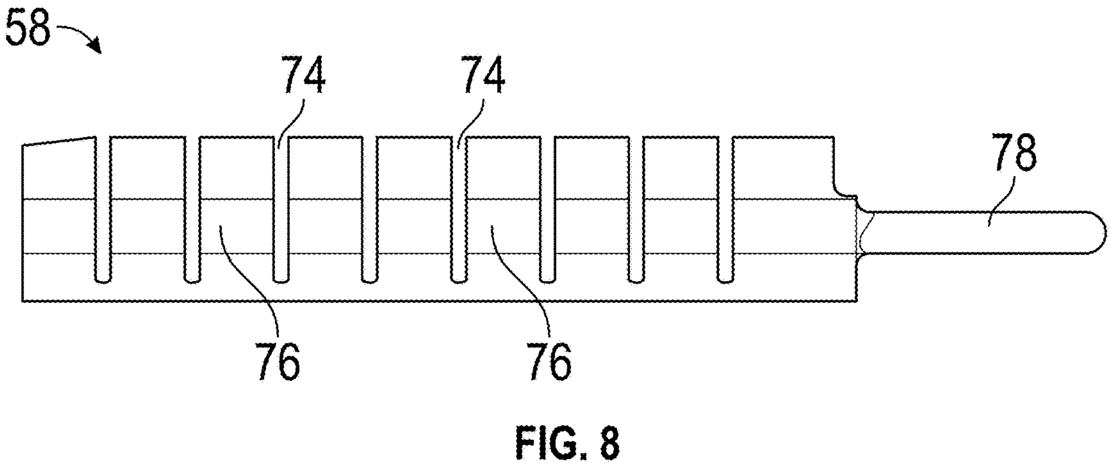
FIG. 8 is a side view of another exemplary embodiment of a flange lock.

Referring now to FIG. 5, in some embodiments, the panel flange 32 and the bracket flange 40 are not straight and linear, but may be, for example, curvilinear. To allow for installation of the flange lock 58 in such embodiments, the flange lock 58 includes a plurality of features to increase flexibility of the flange lock 58. For example, in some embodiments such as FIG. 6, the flange lock 58 is configured with a bi-material construction. The flange lock 58 includes a plurality of first sections 70 formed from a first material and a plurality of second sections 72 formed from a second material having a stiffness less than the first material. In some embodiments, the first sections 70 and the second sections 72 alternate along a length of the flange lock 58. In other embodiments, such as illustrated in FIGS. 7 and 8, the flange lock 58 may include one or more slits 74 arrayed along the length of the flange lock 58, so that the flange lock 58 has a plurality of lock sections 76 separated by the slits 74. These features improve flexibility of the flange lock 58 allowing for improved installation to non-linear flange configurations. Additionally, this or other embodiments of the flange lock 58 may include a handle 78, formed as a ring or like, at one end of the flange lock 58. The handle 78 improves ease of installation and removal of the flange lock 58.

Figure 9:
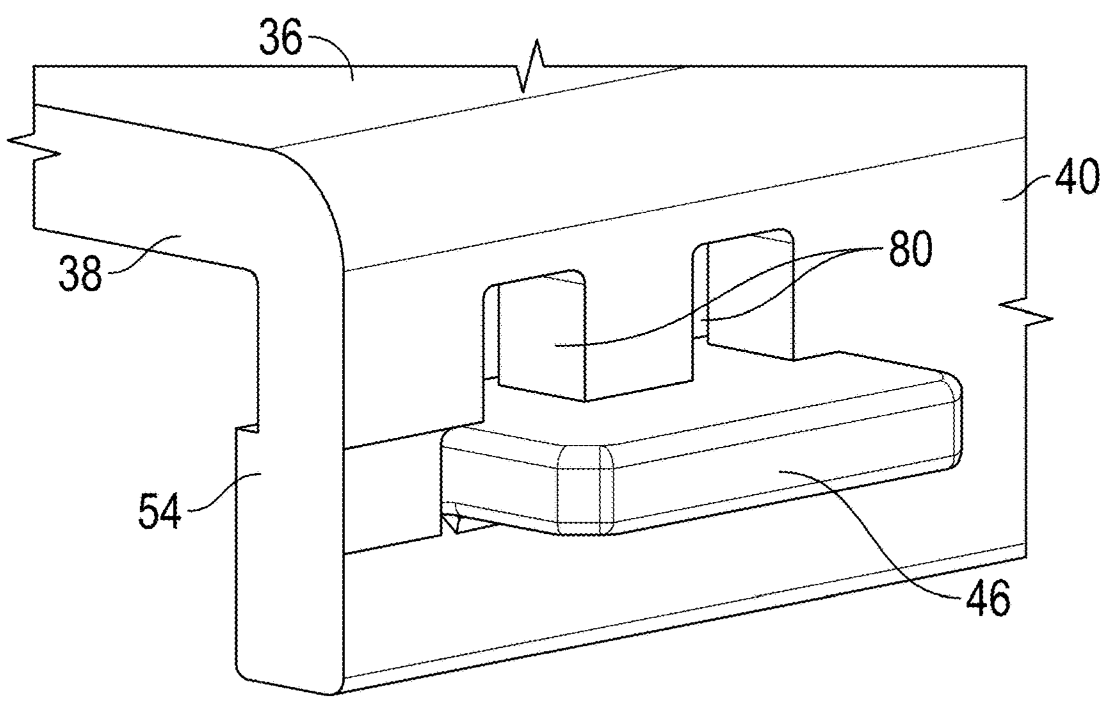
FIG. 9 is a perspective view of an exemplary embodiment of a flange bracket.
Figure 10:
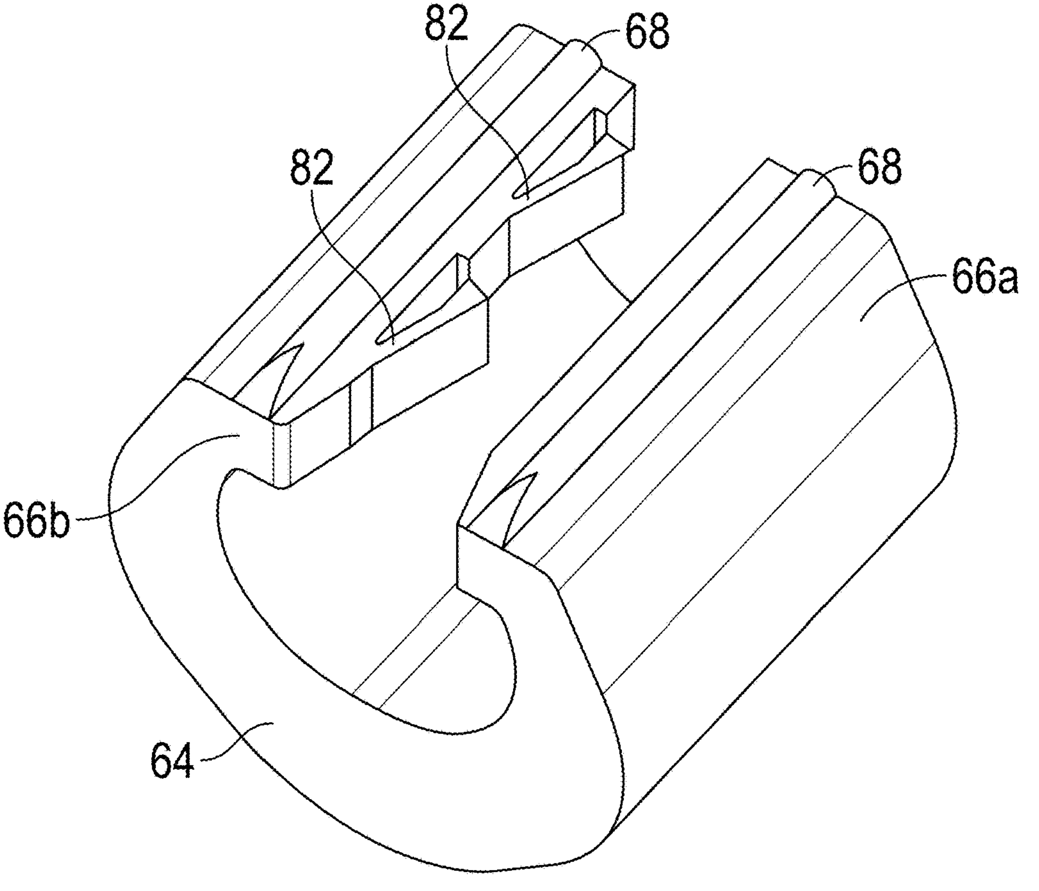
FIG. 10 is a perspective view of another exemplary embodiment of a flange lock.
Figure 11:
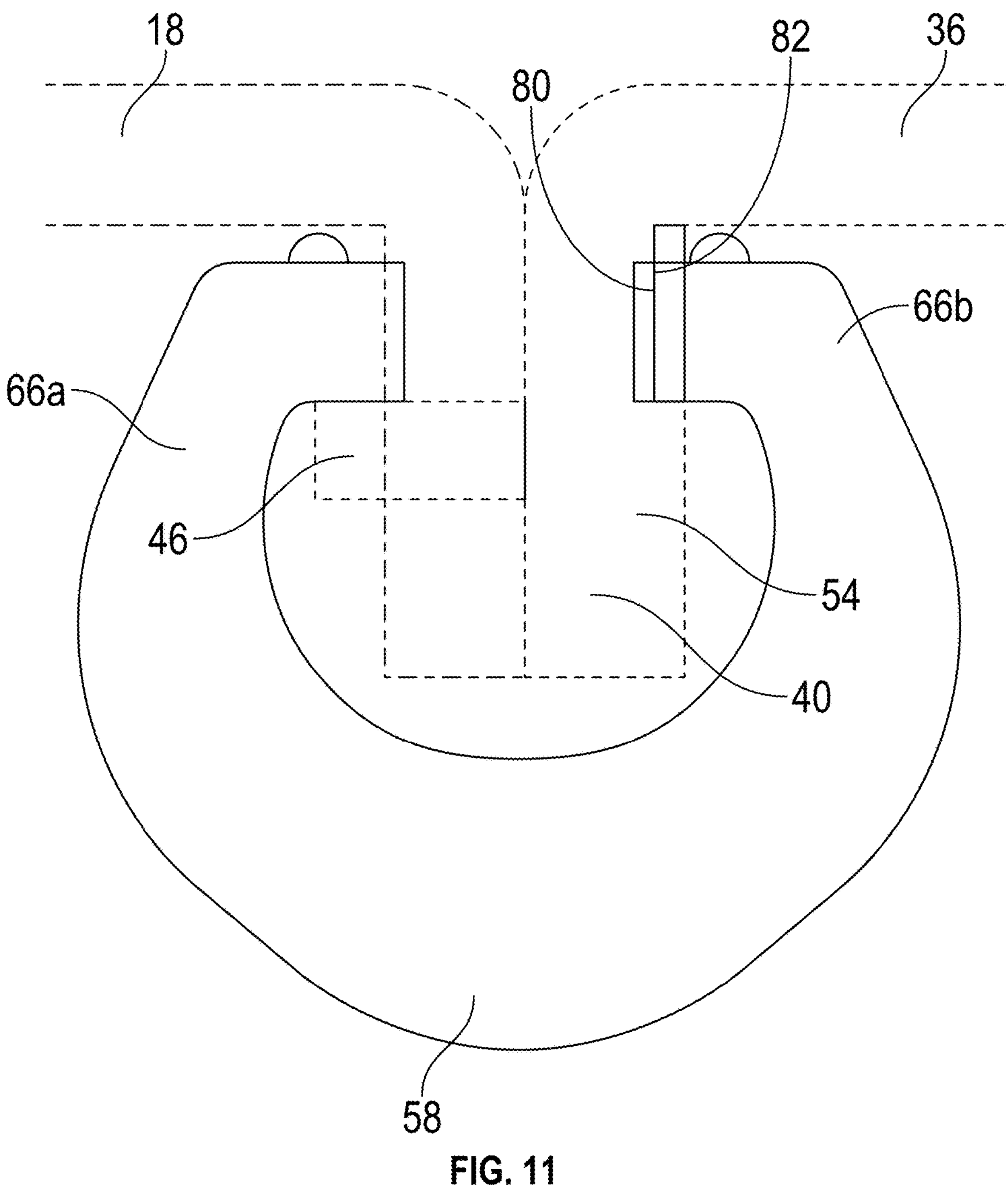
FIG. 11 is a cross-sectional view of another exemplary embodiment of a flange interface.

Referring now to FIGS. 9, 10 and 11, in another embodiment the bracket flange 40 includes one or more bracket openings 80 located between the bracket flange teeth 46 and the bracket body 38. The flange lock 58 includes one or more leg locks 82 at the second lock arm 66*b*. The leg locks 82 are each received in a respective bracket opening 80 when the flange lock 58 is installed, as illustrated in FIG. 11. The leg locks 82 secure the flange lock 58 in the installed position preventing incidental release of the flange lock 58.

Figure 12:
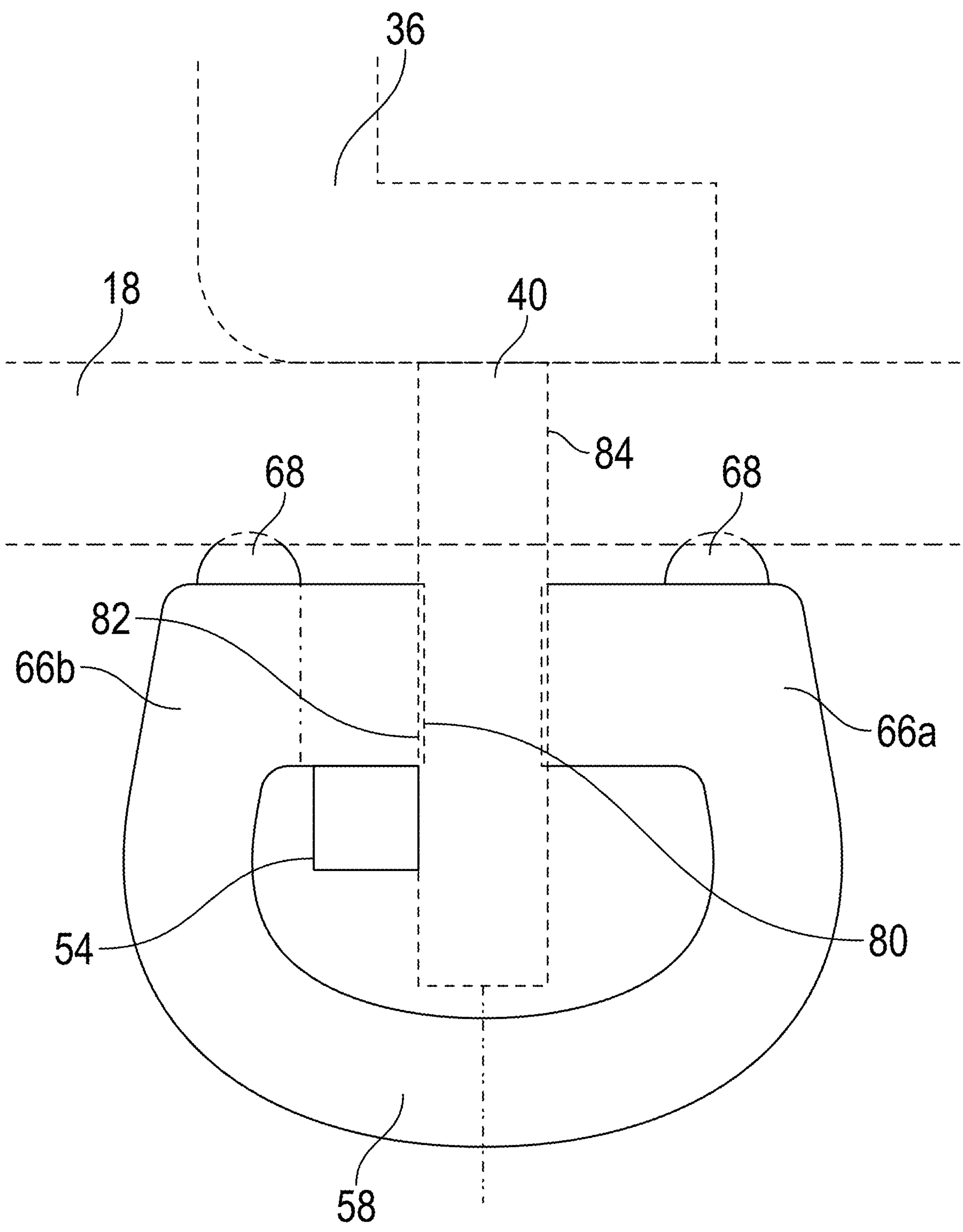
FIG. 12 is a cross-sectional view of yet another exemplary embodiment of a flange interface.
Figure 13:
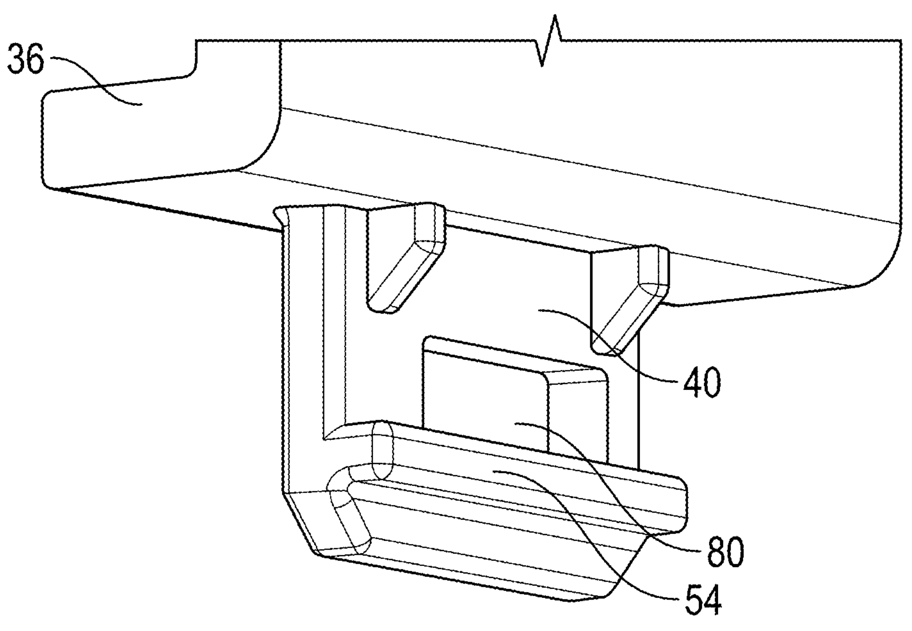
FIG. 13 is a perspective view of yet another embodiment of a flange bracket.
Figure 14:
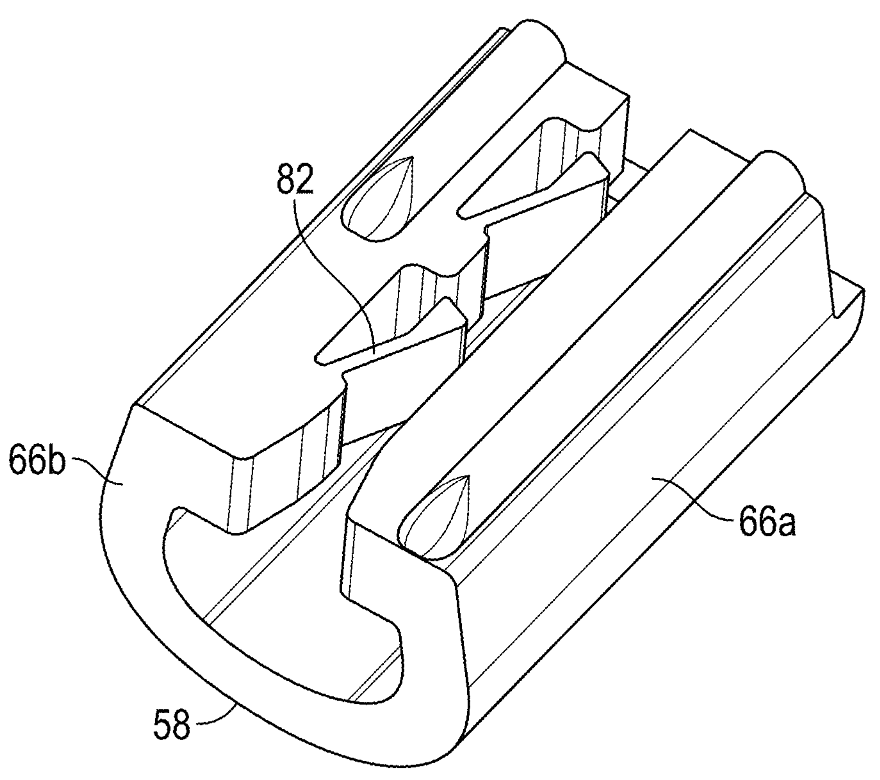
FIG. 14 is a perspective view of yet another embodiment of a flange lock.

While in some embodiments, as described above, the flange lock 58 is utilized at a flange-to-flange interface, the flange lock 58 may also be utilized in other interface configurations, such as a T-interface as illustrated in FIGS. 12, 13 and 14. The body panel 18 includes a panel opening 84 through which the bracket flange 40 extends. The bracket flange 40 includes one or more of the bracket openings 80 and the bracket rib 54. The flange lock 58 is then installed onto the bracket flange 40 to retain the bracket flange 40 in the installed positioned through the panel opening 84, with the arm ribs 68 biasing the lock arms 66 toward engagement with the bracket rib 54. Further, in some embodiments, the flange lock 58 includes one or more leg locks 82 that are received in the bracket openings 80 when the flange lock 58 is installed to retain the flange lock 58 to the bracket flange 40.

The benefits of using the flange lock 58 configurations disclosed herein include a reduction in part count and fastener count (along with their associated mass), an improvement in packaging space at the interface, and a reduction or elimination of tool clearance needed to drive fasteners and install the flange lock 58. This solution provides more design freedom for placement of panel breaks without compromising the ability to hold these interfaces firmly together.

The terms "a" and "an" do not denote a limitation of quantity, but rather denote the presence of at least one of the referenced item. The term "or" means "and/or" unless clearly indicated otherwise by context. Reference throughout the specification to "an aspect," means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

The term "about" is intended to include the degree of error associated with measurement of the particular quantity based upon the equipment available at the time of filing the application. For example, "about" can include a range of ±8% of a given value.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An assembly of a first component and a second component of a vehicle, comprising:

a first component having a first flange and a plurality of first flange openings in the first flange;

a second component having a second flange and a plurality of second flange teeth, the plurality of second flange teeth extending through the plurality of first flange openings; and a flange lock installed over the first flange and the second flange to retain the first flange to the second flange, the flange lock including a first lock arm and a second lock arm, the first lock arm engaging the plurality of second flange teeth.

2. The assembly of claim 1, wherein the flange lock includes a lock spine, with the first lock arm and the second lock arm extending from the lock spine.

3. The assembly of claim 1, wherein the flange lock has a substantially C-shaped cross-section.

4. The assembly of claim 1, wherein:

the plurality of second flange teeth extend from a first side of the second flange and a rib extends from a second side of the second flange opposite the first side; and the second lock arm engages the rib.

5. The assembly of claim 4, wherein the second lock arm includes a second arm rib protruding therefrom configured to bias the second lock arm into engagement with the rib.

6. The assembly of claim 1, wherein the first lock arm includes a first arm rib protruding therefrom configured to bias the first lock arm into engagement with the plurality of second flange teeth.

7. The assembly of claim 1, wherein the flange lock includes a plurality of first portions formed from a first material having a first stiffness and a plurality of second portions formed from a second material having a second stiffness different from the first stiffness.

8. The assembly of claim 1, further comprising a handle extending from an end of the flange lock.

9. The assembly of claim 1, further comprising:

a plurality of second flange openings in the second flange; and one or more second leg locks disposed in the second lock arm configured to engage the plurality of second flange openings.

10. A vehicle, comprising:

a body panel of the vehicle including a panel flange, the panel flange including a plurality of panel flange openings;

a bumper cover assembly including a bumper cover flange, the bumper cover flange including a plurality of cover flange teeth, the plurality of cover flange teeth extending through the plurality of panel flange openings; and a flange lock installed over the panel flange and the bumper cover flange to retain the panel flange to the bumper cover flange, the flange lock including a first lock arm and a second lock arm, the first lock arm engaging the plurality of cover flange teeth.

11. The vehicle of claim 10, wherein the flange lock includes a lock spine, with the first lock arm and the second lock arm extending from the lock spine.

12. The vehicle of claim 10, wherein the flange lock has a substantially C-shaped cross-section.

13. The vehicle of claim 10, wherein:

the plurality of cover flange teeth extend from a first side of the bumper cover flange and a rib extends from a second side of the bumper cover flange opposite the first side; and the second lock arm engages the rib.

14. The vehicle of claim 13, wherein the second lock arm includes a second arm rib protruding therefrom configured to bias the second lock arm into engagement with the rib.

15. The vehicle of claim 10, wherein the first lock arm includes a first arm rib protruding therefrom configured to bias the first lock arm into engagement with the plurality of cover flange teeth.

16. The vehicle of claim 10, wherein the flange lock includes a plurality of first portions formed from a first material having a first stiffness and a plurality of second portions formed from a second material having a second stiffness different from the first stiffness.

17. The vehicle of claim 10, further comprising a handle extending from an end of the flange lock.

18. The vehicle of claim 10, further comprising:

a plurality of cover flange openings in the bumper cover flange; and one or more second leg locks disposed in the second lock arm configured to engage the plurality of cover flange openings.

19. The vehicle of claim 10, wherein the bumper cover assembly includes:

a bumper cover; and a cover bracket secured to the bumper cover;

wherein the bumper cover flange is defined in the cover bracket.

20. A method of installing a bumper cover assembly to a vehicle body, including:

providing a body panel of the vehicle, the body panel including a panel flange, the panel flange including a plurality of panel flange openings;

installing a bumper cover assembly including a bumper cover flange to the body panel, the bumper cover flange including a plurality of cover flange teeth, the bumper cover assembly including plurality of cover flange teeth extending through the plurality of panel flange openings; and installing a flange lock over the panel flange and the bumper cover flange to retain the panel flange to the bumper cover flange, the flange lock including a first lock arm and a second lock arm, the first lock arm engaging the plurality of cover flange teeth.

* * * * *